United States Patent [19]

Smith, Jr. et al.

[11] 4,273,698
[45] Jun. 16, 1981

[54] SELF-BONDING ROOM TEMPERATURE VULCANIZABLE SILICONE RUBBER COMPOSITIONS

[75] Inventors: Alfred H. Smith, Jr., Ballston Lake; George P. De Zuba, Mechanicville; Tyrone D. Mitchell, Colonie, all of N.Y.

[73] Assignee: General Electric Company, Waterford, N.Y.

[21] Appl. No.: 16,254

[22] Filed: Feb. 28, 1979

[51] Int. Cl.³ ............................................. C08L 83/06
[52] U.S. Cl. .................... 260/37 SB; 428/447; 428/450; 428/451; 525/477; 525/474; 528/11; 528/32
[58] Field of Search ............ 260/37 SB, 825; 528/11, 528/32; 525/477; 427/447

[56] References Cited

U.S. PATENT DOCUMENTS

| | | | |
|---|---|---|---|
| 2,938,009 | 5/1960 | Lucas | 260/37 SB |
| 3,004,859 | 10/1961 | Lichtenwalner | 106/308 |
| 3,035,016 | 5/1962 | Bruner | 528/33 |
| 3,065,194 | 11/1962 | Nitzsche et al. | 260/37 SB |
| 3,122,522 | 2/1964 | Brown et al. | 528/32 |
| 3,133,891 | 5/1964 | Ceyzeriat | 260/18 |
| 3,161,614 | 12/1964 | Brown et al. | 528/11 |
| 3,170,894 | 2/1965 | Brown et al. | 528/11 |
| 3,175,993 | 3/1965 | Weyemberg | 528/11 |
| 3,179,612 | 4/1965 | Plueddeman | 260/29.2 R |
| 3,274,145 | 9/1966 | Dupree | 260/37 SB |
| 3,294,739 | 12/1966 | Weyenberg | 528/11 |
| 3,296,161 | 1/1967 | Kulpa | 260/18 |
| 3,334,067 | 8/1967 | Weyenberg | 528/42 |
| 3,382,205 | 5/1968 | Beers | 528/41 |
| 3,383,355 | 5/1968 | Cooper | 528/42 |
| 3,499,859 | 3/1970 | Matherly | 260/37 SB |
| 3,517,001 | 6/1970 | Berger | 260/248 |
| 3,542,901 | 11/1970 | Cooper et al. | 260/825 |
| 3,635,743 | 1/1972 | Smith | 106/288 Q |
| 3,689,454 | 9/1972 | Smith et al. | 528/11 |
| 3,708,467 | 1/1973 | Smith et al. | 260/185 |
| 3,719,635 | 3/1973 | Clark et al. | 528/11 |
| 3,730,932 | 5/1973 | De Zuba | 260/29.1 SB |
| 3,759,968 | 9/1973 | Berger et al. | 528/15 |
| 3,773,817 | 11/1973 | Berger et al. | 260/448.2 B |
| 3,778,459 | 12/1973 | Berger et al. | 260/448.2 N |
| 3,779,986 | 12/1973 | Smith et al. | 528/11 |
| 3,780,080 | 12/1973 | Berger et al. | 260/448.2 B |
| 3,793,361 | 2/1974 | Berger et al. | 260/448.2 N |
| 3,806,532 | 4/1974 | Berger et al. | 260/448.2 B |
| 3,808,248 | 4/1974 | Berger et al. | 260/448.2 B |
| 3,813,364 | 5/1974 | De Zuba et al. | 260/37 SB |
| 3,888,815 | 6/1975 | Bessmer et al. | 528/38 |
| 3,896,123 | 7/1975 | De Zuba et al. | 260/32.6 A |
| 3,941,741 | 3/1976 | De Zuba et al. | 260/37 SB |
| 4,100,129 | 7/1978 | Beers | 260/37 SB |

FOREIGN PATENT DOCUMENTS 1337516 8/1963 France.
1099619 1/1968 United Kingdom.

*Primary Examiner*—Wilbert J. Briggs, Sr.
*Attorney, Agent, or Firm*—E. Philip Koltos; J. L. Young; Philip L. Schlamp

[57] ABSTRACT

A self-bonding room temperature vulcanizable silicone rubber composition comprising a silanol-terminated diorganopolysiloxane base polymer, a filler, a crosslinking agent selected from carboxyl functional silanes and hydrocarbonoxy functional silanes, a curing catalyst and as the self-bonding additive a silyl maleate or a silyl fumarate or a silyl succinate. In place of the foregoing silane self-bonding additives there may be utilized as a self-bonding additive, a maleate functional polysiloxane, a fumarate functional polysiloxane or a succinate functional polysiloxane.

30 Claims, No Drawings

SELF-BONDING ROOM TEMPERATURE VULCANIZABLE SILICONE RUBBER COMPOSITIONS

BACKGROUND OF THE INVENTION

The present invention relates to room temperature vulcanizable silicone rubber compositions and more particularly the present invention relates to room temperature vulcanizable silicone rubber compositions in which there is a self-bonding additive selected from silyl maleates, silyl fumarates and silyl succinates such that the composition will bond to various substrates in the absence of a primer.

Room temperature vulcanizable silicone rubber compositions are well known in silicone chemistry. Basically these compositions break down to one-component or one-part room temperature vulcanizable silicone rubber compositions and two-component or two-part room temperature vulcanizable silicone rubber compositions. Basically, the two-component room temperature vulcanizable silicone rubber composition comprises a silanol terminated base polymer, an alkyl silicate or the partial hydrolysis product of an alkyl silicate as a crosslinking agent, a filler and a metal salt of a carboxylic acid as the curing catalyst.

Normally, the crosslinking agent is packaged or prepared separately from the silanol base polymer and when it is desired to cure the composition the two components are normally mixed and applied to whatever shape it is desired, whereupon the composition will cure either in the presence of or in the absence of moisture to a silicone elastomer. There are also SiH-olefin platinum catalyzed two-component room temperature vulcanizable silicone rubber compositions, however, these will not be discussed in detail since they form no part of the present invention.

With respect to the one-component system, or one-part room temperature vulcanizable silicone rubber compositions, such compositions generally comprise a silanol terminated diorganopolysiloxane polymer as the base polymer and acyloxy functional silane or an alkoxy functional silane or an amide functional silane or a ketoximino functional silane or various other types of functional silanes and finally a curing catalyst which in the case of the acyloxy functional silane crosslinking agent is a metal salt of a carboxylic acid, most typically a tin salt of a carboxylic acid. In the case of the alkoxy functional silane crosslinking agents the catalyst is frequently a titanimum compound. To these three ingredients there may be added other ingredients such as fillers, flame-retardant additives, etc. These ingredients in the one-part of one-component room temperature vulcanizable silicone rubber compositions are normally mixed together in the anhydrous state and packaged as such in waterproof containers. When it is desired to cure the composition, the one-component room temperature vulcanizable silicone rubber composition is taken out of the waterproof container, applied to whatever form it is desired and exposed to atmospheric moisture. In the presence of atmospheric moisture, such compositions cure to a silicone elastomer. Thus, it can be seen that the one-component systems have the advantage over the two-component systems in that the components are already mixed and an unskilled worker in the field does not have to take measured amounts of the two-components and mix them together so as to produce the desired curable composition as is the case in the two-component system. However, both of these compositons have found their place in the field. Examples of such room temperature vulcanizable silicone rubber compositions are for instance to be found in U.S. Pat. No. 3,065,194, Bruner U.S. Pat. No. 3,035,016, in Ceyzeriat U.S. Pat. No. 3,133,891, in Brown et al. U.S. Pat. No. 3,161,614, in Cooper U.S. Pat. 3,383,355, in Matherly U.S. Pat. No. 3,499,859, in Cooper et al. U.S. No. 3,542,901, in Brown et al. U.S. Pat. No. 3,122,522, in Brown et al. U.S. Pat. No. 3,170,894, in Weyenberg U.S. Pat. No. 3,175,993, in Smith and Hamilton U.S. Pat. No. 3,689,454, and U.S. Pat. No. 3,779,986, in Weyenberg U.S. Pat. No. 294,739 and 3,334,067 and Clark et al. U.S. Pat. No. 3,719,635. Also, special notice should be taken of Beers U.S. Pat. No. 3,382,205 which discloses a polysiloxane additive for one-component room temperature vulcanizable silicone rubber compositions.

All these patents relate to the basic room temperature vulcanizable silicone rubber compositions or improvements thereover. One particular concern, with respect to room temperature vulcanizable silicone rubber compositions, was the adhesion of such compositions to various substrates, such as for instance metallic substrates, plastic substrates, cellulosic substrates, masonry substrates and so forth. Early in the development of such compositions primers were utilized to enhance adhesion, whereupon the primer was applied over the surface to which the silicone composition was to be applied to and then the silicone composition would be applied thereover and cured at room temperature to form a silicone elastomer, which would bind or adhere to the substrate because of the presence of the primer. Although this was advantageous, nevertheless, in the application of the composition, it required the use of an extra step. Since labor is expensive it became desirable to eliminate such primer application step in the use of room temperture vulcanizable silicone rubber compositions. Accordingly, various additives were devised to be added to room temperature vulcanizable silicone rubber compositions prior to their being packaged in containers such that the compositions when applied to a substrate would cure to a silicone elastomer, which would adhere to the substrate in the absence of a primer. An example of such an additive, which shall be referred to as a self-bonding additive in two-part room temperature vulcanizable silicone rubber compositions, is for instance to be found in Bessmer or Lampe U.S. Pat. No. 3,888,815, which discloses the use of nitrogen functional silanes are self-bonding additives for two-component room temperature vulcanizable silicone rubber compositions. However, such nitrogen functional silanes while being helpful self-bonding additives for two-component room temperature vulcanizable silicone rubber compositions were not very effective for one-component RTV (Room Temperature Vulcanizable) silicone composition.

Prior to these developments in two-component RTV self-bonding additives were developed for various one-componnt RTV compositions having various types of crosslinking agents. For instance, for the acetoxy functional one-component RTV system there was developed a diacyloxy, dialkoxy silane as a self-bonding additive which was very effective. Such an additive is disclosed, for instance, in Kulpa U.S. Pat. No. 3,296,161. Such a self-bonding additive was found to be very effective for a system in which the crosslinking agent was methyltriacetoxysilane. Another example of a self-bonding additive is that to be found in Beers U.S. Pat. No. 4,100,129, which discloses the use of a silylisocyanurate as a self-bonding additive for a one-part RTV system in which the crosslinking agent was methyltrimethoxysilane and the curing catalyst was a titanium chelate catalyst. However, there is always a desire to find further self-bonding additives that can be added to one component RTV systems, which are as good as the silyl isocyanurates or even better.

Heat vulclanizable silicone rubber compositions are also well-known. Such compositions generally comprise of vinyl-containing polysiloxane gum and of a viscosity varying from one million to three hundred million centipoise at 25° C., silica filler, various process aids and a peroxice curing catalyst. When the composition is heated at elevated temperatures and preferably above 100° C., the composition dures to a silicone elastomer. The presence of moisture has nothing to do with the cure of such compositions, but the cure is carried out by free radicals released by the peroxide when it is heated at elevated temperatures. For such compositions see Selin and Berger U.S. Pat. No. 3,780,080, in which silyl maleates and silyl fumerates and also maleate functional polysiloxanes and fumerate functional polysiloxanes are used as self-bonding additives. This patent is one of a number of divisional patents which was selected at random to illustrate the use of such maleates and fumerates as self-bonding additives for heat vulcanizable silicone rubber compositions.

Also note should be taken of Berger and Selin U.S. Pat. No. 3,759,968, which discloses the preparation and presence of silyl maleates and silyl fumerates as as compounds. Recently, there has been developed a one component RTV system which utilizes as a crosslinking agent, an organosilane, having as functional groups carboxyl radicals of from 6 to 10 carbon atoms. The known self-bonding additives for one-part RTV systems functions somewhat with such a one-part RTV composition. However, they were not found to be as effective as would be desired. Such a one-component RTV system and specifically one having as the crosslinking agent methyl tris 2-(ethylhexanoxy) silane with various self-bonding additives is disclosed for instance in the patent application of M. D. Beers, Ser. No. 919,544, filed on June 27, 1978. It should be noted herein that all the foregoing patents and patent applications mentioned in this specification are incorporated by reference under the present specification.

Accordingly, it became desirable to develop a new self-bonding additive for a one-component RTV system which utilizes a carboxyl functional silane as a crosslinking agent, as for instance disclosed in the Beers Pat. applications of Ser. No. 919,544. Accordingly, it was highly unexpected that silyl maleates and fumerates of the foregoing heat vulcanizable silicone rubber compositions could be utilized as self-bonding additives for one-component RTV systems.

It is one object of the present invention to provide for a self-bonding one-part RTV composition which utilizes as its self-bonding additives silyl maleates, silyl fumerates and silyl succinates.

It is an additional object of the present invention to provide for self-bonding one-part RTV system which has as the crosslingking agent carboxyl functional silane where the carboxyl group contains 6 or more carbon atoms in which the self-bonding additive is a silyl fumerate, silyl maleate or silyl succinates or mixtures thereof.

It is a further object of the present invention to provide for self-bonding one-part RTV compositions which will adhere to various plastic, metal, cellulosic and masonry substrates in the absence of a primer where the self-bonding additive is a silyl maleate, silyl fumerate or silyl succinate.

There is still an additional object of the present invention to provide for a laminate which is formed from a substrate selected from metals, plastics, cellulosic substrates and masonry substrates, to which there is applied a self-bonding one-part RTV composition which adheres to the substrate in the absence of a primer and in which system the cross-linking agent is selected from hydrocarbonoxy functional silanes and carboxyl functional silanes.

It is yet an additional object of the present invention to provide for a process for producing a self-bonding one-component RTV system, which has as the cross-linking agent a hydrocarbonoxy functional silane or a carboxyl functional silane in which the self-bonding additive is selected from silyl maleates, silyl fumerates and silyl succinates. These and other objects of the present invention are accomplished by means of the disclosure set forth herein below.

SUMMARY OF THE INVENTION

There is provided by the present invention, in accordance with the above objects, a self-bonding room temperature vulcanizable silicone rubber composition comprising: (a) 100 parts by weight of a silanol terminated diorganopolysiloxane having a viscosity varying from 300 to 10,000,000 centipoise at 25° C. where the organo group is a monovalent hydrocarbon radical; (b) from 5 to 200 parts by weight of a filler; (c) from 2 to 10 parts by weight of a crosslinking agent selected from the class consisting of carboxyl functional silanes and hydrocarbonoxy functional silanes; (d) from 0.01 to 10 parts by weight of a curing catalyst selected from the class consisting of carboxylic acid salts and titanates; and (e) from 0.1 to 3 parts by weight of a self-bonding additive selected from the groups consisting of:

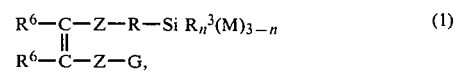

(1)

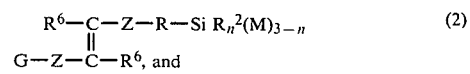

(2)

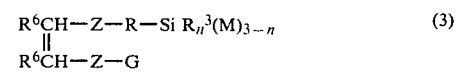

(3)

where Z is selected from

phenylene,

CONH and $CONR_2{}^2$ G is selected from the class consisting of hydrogen, R', $R^4SiR_n{}^2(M)_{3-n}$ where R' is selected from monovalent hydrocarbon radicals and halogenated monovalent hydrocarbon radicals, R and $R^4$ is a divalent hydrocarbon radical, $R^2$ is selected from monovalent hydrocarbon radicals and halogenated monovalent hydrocarbon radicals, M is selectred from $R^3O$ and

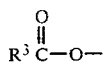

radicals $R^3$ is selected from monovalent hydrocarbon radicals and halogenated monovalent hydrocarbon radicals, $R^6$ is selected from hydrogen, and alkyl radicals of up to 10 carbon atoms and n is a whole number that varies from 1 to 3, and self-bonding polysiloxane additives selected from the group consisting of the formulas,

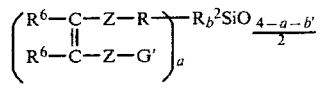 (4)

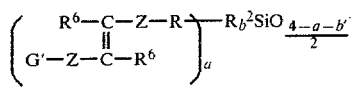 (5)

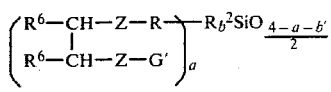 (6)

where G' is selected from the class consisting of hydrogen, R' and $R^4H_cR_d^2SiO_{(3-c-d/2)}$ and where Z, R', $R^4$, $R^2$ and R are as previously defined, a varies from 0.005 to 2.0, b' varies from 1.0 to 2.5, the sum of a+b varies from 1.005 to 3.0, c varies from 0 to 1.0, d varies from 1.0 to 2.5 and the sum of c+d varies from 1.0 to 2.0.

The preferred crosslinking agents are methyl tris 2-(ethylhexanoxy)silane and methyl trisbenzoxysilane. Also preferably there is in the composition a fluid polysiloxane containing a high degree of trifunctionality and tetrafunctionality. The preferred curing catalyst is an organic tin salt of an organic acid or a tin salt of an organic acid, said organic acid containing from 2 to 6 carbon atoms. This type of catalyst gives the fastest cure rate for the composition. These and other parts of the present composition will be made obivous by the disclosure below. However, it should be noted that the silyl maleates, silylfumerates, silyl succinates and maleate functional polysiloxanes, fumerate functional polysiloxanes and succinates functional polysiloxanes as disclosed above, are suitable and effective self-bonding additives for all one-part RTV compositions in which the crosslinking agent is a hydrocarbonoxy functional silane or in which the crosslinking agent is a carboxyl functional silane.

DESCRIPTION OF THE PREFERRED EMBODIMENT

There is present in the composition, 100 parts per weight of a silanol terminated diorganopolysiloxane polymer having a viscosity varying from 300 to 10,000,000 centipoise at 25° C. where the organo group is a monovalent hydrocarbon radical. Preferably such a polymer is basically a linear polymer with up to 0.1% by weight of trifunctionality or monofunctionality in the polymer. More preferably the viscosity of the polymer varies from 1,000 to 500,00 centipoise at 25° C. The monovalent hydrocarbon substituent groups can be selected from many monovalent hydrocarbon substituent groups normally known for such polymers. For instance, they can be selected from alklyl radicals of 1 to 8 carbon atoms such as methyl, ethyl, propyl, cycloalkyl radicals such as cyclohexyl, cycloheptyl and etc., mononuclear aryl radicals such as phenyl, methylphenyl, ethylphenyl and etc. and haloalkyl radicals such as 3,3,3-trifluoropropyl. The silanol terminated diorganopolysiloxane polymer may have the formula,

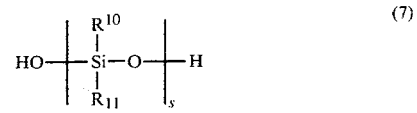 (7)

wherein $R^{10}$ and $R^{11}$ are each independently selected from organic radicals of up to 8 carbon atoms such as hydrocarbyl, halohydrocarbyl and s is an average number of from about 10 to 15,000. The viscosity of the foregoing linear silanol terminated polysiloxane can vary broadly in the range of 300 to 10,000,00 centipoise at 25° C. preferably the viscosity is in the range of 1,000 to 500,000 centipoise and more preferably in the range of 2,000 to 150,000 centipoise at 25° C. These polymers are well-known and are easily produced in the silicone industry. Briefly, the process for producing such polymers comprises hydrolyzing diorganodichlorosilanes and then taking the hydrolyzate and cracking it with KOH and preferentially distill overhead or diorgano substituted cyclotetrasiloxanes. The foregoing cyclotetrasiloxanes are then equilibrated at elevated temperatures above 150° C. in the presence of small amounts of KOH and in the presence of chainstoppers such as low molecular weight silanol terminated diorganopolysiloxane polymers so as to preferentially form the silanol terminated diorganopolysiloxane polymers of the instant case and of the foregoing formula. This is followed by neutralization and frequently by devolatilization.

With the silanol terminated diorganopolysiloxane polymer there is utilized from 5 to 200 parts by weight of a filler based on 100 parts of the base polymer. The filler may be reinforcing or extending filler and is more preferably a reinforcing filler selected from precipitated silica and fumed silica, most preferably being fumed silica. Examples of extending fillers that can be utilized are, for instance, titanium dioxide, lithopone, zinc oxide, zirconium silicate, silica aerogel, iron oxide, diatomaceous earth, fibers, magnesium oxide, chromic oxide, zirconium oxide, alpha quartz, calcined clay, asbestos, carbon, graphite, cork, cotton and synthetic fibers. However, as pointed out previously, most preferably there is utilized as a filler, a fumed silica or precipitated silica and most preferably a fumed silica that has been treated with a silicone compound. The preferred silica will be an organosilicone and silazane treated silica as described in Lucas, U.S. Pat. No. 2,938,009, Lichtenwalner, U.S. Pat. No. 3,004,859 and Smith, U.S. Pat. No. 3,635,743, which are incorporated into the present case by reference.

Finally, per 100 parts of the silanol terminated diorganopolysiloxane polymer there is utilized anywhere from 2 to 10 parts of a crosslinking agent which is selected from the class consisting of carboxylic functional silanes and hydrocarbonoxy functional silanes.

A suitable crosslinking agent for a hydrocarbonoxy functional silane would be an alkyltrialkoxysilane, such as, for instance, methyltrimethoxysilane. With such an alkoxy functional silane crosslinking agent there has to be utilized a titanium chelate catalyst as disclosed by the foregoing Smith and Hamilton, U.S. Pat. No. 3,689,454. However, most preferably there is utilized in the instant case a carboxyl functional silane crosslinking agent; the carboxyl group contains anywhere from 6 to 30 carbon atoms.

It can be appreciated, however, that the foregoing self-bonding additives in the invention of the instant case also applies to one-part RTV compositions in which the carboxyl group contains less than 6 carbon atoms such as, methyltriacetoxysilane. However, the preferred crosslinking agent is a carboxy functional silane which contains anywhere from 6 to 30 carbon atoms in the carboxyl group, for instance, such as methyl-tris(2-ethylhexanoyloxy)silane and methyl-tris(benzoxy)silane. With such crosslinking agents there is preferably utilized as a curing catalyst from 0.01 to 5 parts by weight of a curing catalyst selected from the class consisting of carboxylic acid salts and titanates. The titanates are suitable catalysts with hydrocarbonoxy functional silane crosslinking agents such as methyltrimethoxysilane, as stated previously.

With the carboxyl functional silane crosslinking agent there is preferably utilized as a catalyst a carboxylic acid salt of a metal varying from lead to manganese in the Periodic Table. Most preferably the metal is tin. Preferably, with the carboxyl functional silane crosslinking agents there is utilized as a curing catalyst from 0.01 to 5 parts by weight of an organic salt of an organic acid or a tin salt of an organic acid.

Accordingly, as one of the basic ingredients of the one-part RTV compositions of the present case there may be used per 100 parts of the silanol base polymer generally anywhere from 0.1 to 3 parts by weight of a self-bonding additive selected from the maleates and fumarates of Formulas 1 and 2, or the succinate of Formula 3, disclosed above or the maleate functional polysiloxane of Formula 4, or the fumarate functional polysiloxane of Formula 5, or the succinate functional polysiloxane of Formula 6, as disclosed above.

From 0.1 to 3 parts by weight of the self-bonding additive of the foregoing self-bonding additives may be utilized in the composition per 100 parts of the base polymer and more preferably there is utilized from 0.5 to 2.5 parts of the self-bonding additive. Maleate silanes and fumarates silanes and succinate silanes are well-known compounds as are the maleate functional polysiloxanes and the fumarate functional polysiloxanes, as noted by the disclosure of such compounds in Berger and Selin, U.S. Pat. No. 3,759,968, which is incorporated into the present case by reference. Although this patent does not disclose silyl succinates, either silane succinates or succinate functional polysiloxanes, nevertheless, by the procedure shown for synthesizing the maleates and fumarates, a worker skilled in the Art could easily synthesize the foregoing silyl succinates.

With respect to the procedure for preparing such silyl maleates and fumarates and succinates as disclosed in U.S. Pat. No. 3,759,968, the silyl maleates, fumarates and even silyl succinates and polysiloxane maleates and fumarates and polysiloxane succinates are obtained by reacting either cis- or trans-1,2-bis(carbalkenoxy)ethylene or 1,2-bis(carbalkenoxy)ethane with a hydrogen halosilane or hydrogen polysiloxane in the presence of a platinum catalyst.

In the case where a reactant is hydrogen halosilane the resulting product is then further reacted with an alcohol, preferably in the presence of an acid acceptor, such as trialkylamine, so as to substitute an alkoxy group for the halo group on the silicon atom. If desired, a hydrogen alkoxy silane may be reacted directly with a cis- or trans-1,2-bis(carbalkenoxy)ethylene or a 1,2-bis(carbalkenoxy)ethane such that the hydrogen adds on to the group in the terminal radical of the cis- or trans ester or succinate ester. However, with the alkoxy group in the silane or polysiloxane the reaction in the presence of a platinum catalyst proceeds somewhat more slowly than in the case where there is present in the silane a halogen in place of an alkoxy group.

For further information as to the preparation of such silyl maleates, fumarates and polysiloxane maleates and fumarates and the application of that technique for the preparation of the succinates, one is referred to the disclosure of the foregoing Berger and Selin, U.S. Pat. No. 3,759,968, which is incorporated by reference into the present case.

It has been found that such maleates, fumarates, succinates and the analogous polysiloxane materials are effective and superior self-bonding additives for one-part RTV compositions in which there is a hydrocarbonoxy functional silane crosslinking agent or a carboxyl functional silane crosslinking agent. Particularly, one in which there is a carboxyl group containing from 6 to 30 carbon atoms.

It should be noted here that in the foregoing formulas of silyl fumarates, maleates and succinates and the corresponding polysiloxane, preferably R is propylene, M is R$^3$O, and R$^2$ and R$^3$ are methyl. Preferably, R$^6$ is hydrogen or methyl, and R$^4$ and R are also preferably methyl. It should be noted that the silyl maleates, fumarates and succinates are preferred over the corresponding functional polysiloxanes since they are easier and cheaper to synthesize. However, the corresponding polysiloxane materials will work effectively as self-bonding additives in the instant case.

The preferred maleate for use as a self-bonding additive of the present invention is bis(trimethoxysilylpropyl)maleate and the corresponding fumarate, of course, bis(trimethoxysilylpropyl)fumarate. The preferred self-bonding additives within the scope of the above formulas are as follows:

maleate, cis

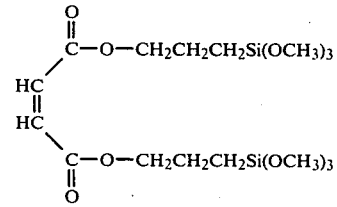

fumarate trans

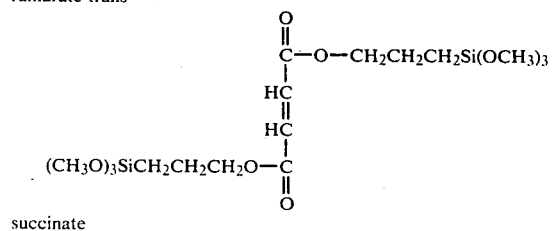

succinate

-continued

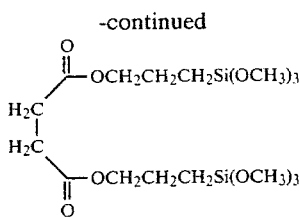

Accordingly, with the above background, it will now be desirable to describe a particular one-part RTV system in which the foregoing maleates, fumarates and succinates are superior self-bonding additives in the system. Such a system comprises 100 parts by weight of the base silanol terminated diorganopolysiloxane polymer that was described previously and most preferably the polymer whose formula was given previously, that is, Formula 7.

Accordingly, with such a system it is preferably desired that there be utilized from 10 to 100 parts by weight of a fumed silica filler. Preferably, such a fumed silica filler should have a surface area of about 200 square meters per gram and one which is treated with cyclicpolysiloxanes or silazanes such as described in the foregoing Smith, Lucas and Lichtenwalner patents. The silica filler is solely utilized as a reinforcing agent in the composition and is generally employed in an amount of from 10 to 100 parts and more preferably from 15 to about 40 parts by weight, per 100 parts by weight of the silanol base polymer and most preferably from 20 to 30 parts by weight, per 100 parts by weight of the base silanol polymer.

In addition, it is preferred in such a preferred system that the crosslinking agent be a carboxyl functional silane crosslinking agent in which the carboxyl group has from 6 to 30 carbon atoms, such a crosslinking agent preferably having the formula, $$R^8_m Si(OR^9)_{4-m}$$

where $R^8$ is a monovalent hydrocarbon radical, $R^9$ is an organic radical of 6 to 30 carbon atoms selected from hydrocarboyl and halohydrocarboyl and m is 0 or 1. It is preferred that $R^9$ should contain between 6 and 30 carbon atoms to preclude formation of odorous, corrosive byproducts during the cure and reaction. Illustrative of such silanes useful in the preferred RTV composition of this invention are the following:

$$CH_3Si[OCO(CH_2)_4CH_3]_3$$

$$Si[OCO(CH_2)_4CH_3]_4$$

$$CH_3(CH_2)_6CH_2Si[OCO(CH_2)_4CH_3]_3$$

$$CF_3(CH_2)_3Si[OCO(CH_2)_4CH_3]_3$$

$$NCCH_2CH_2Si[OCO(CH_2)_4CH_3]_3$$

$$CH_3Si[OCOCH(C_2H_5)(CH_2)_3CH_3]_3$$

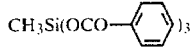

-continued

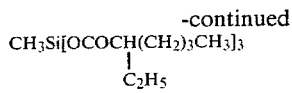

The silanes are well-known in the Art and can be made by techniques disclosed for example, in Beers, U.S. Pat. No. 3,382,205, which is incorporated by reference. Preferably, in the crosslinking agent, m has a value of 1 and the preferred silanes are methyl-tris(2-ethylhexanoxy)silane and methyl-tris(benzoxy)silane. The silane is generally used in amounts of from 3 to 10 parts by weight based on 100 parts by weight of the silanol base polymer and there is preferably used from 5 to 7 parts by weight per 100 parts of the base silanol polymer.

In such a system there is preferably utilized a curing catalyst which as stated previously can be any organic metal salt of a carboxylic acid or a metal salt of a carboxylic acid where the metal is selected from lead to manganese in the Periodic Table. Most preferably the metal is tin since that gives the most rapid cure rate of the composition. Accordingly, there may be utilized as a curing catalyst in the instant composition an organic tin salt of an organic acid or a tin salt of an organic acid. For most rapid cure there is desired an organic acid, carbon content of between 2 to 6 carbon atoms which provide the best combination of cure rate and ultimate properties. The organic element of the organic tin salt can be one or two alkyl radicals, e.g., of from 2 to 6 carbon atoms. Examples are tin hexanoate, dibutyl tin dihexanoate, dibutyl tin diacetate, dibutyl tin adipate, dibutyl tin dipropionate, dibutyl tin dibutyrate, monobutyl tin triacetate, and the like. These catalysts are either commercially available or can be made by those skilled in the Art. The preferred catalyst is dubutyl tin diacetate. However, as pointed out previously, this limitation in the curing catalyst of the organic acid carbon content (the carboxylic acid content of 2 to 6 carbon atoms) is desired so as to give the composition the most rapid cure rate. If a rapid cure rate is not a requirement then there can be utilized an organic tin salt of an organic acid or carboxylic acid in which the the organic acid or carboxylic acid can have anywhere from 2 to 30 carbon atoms. Generally, the catalyst is present in amounts between 0.01 and 5.0 parts by weight per 100 parts by weight of the base silanol polymer and preferably there is utilized between 0.02 and 3.0 parts by weight. The most preferred level is from about 0.03 to about 0.15 parts by weight of the curing catalyst for each 100 parts by weight of the total composition.

In the silanol terminated polymer of Formula (7) above, it should be noted that it is preferred that s in the formula vary from 10 to 15,000 and more preferably vary from 100 to 3,000 and most preferably vary from 300 to 1,500. The silanol-terminated polysiloxane of Formula (7) is well-known in the Art and includes compositions containing different $R^{10}$ and $R^{11}$ radicals; for example, the $R^{10}$ can be methyl while the $R^{11}$ can be phenyl. Furthermore, within the scope of the definition of polydiorganosiloxanes used in this invention are copolymers of various types of diorganosiloxy units, silanol chainstopped copolymers of dimethylsiloxy units, diphenylsiloxy units or methylphenylsiloxy units or, for example, copolymers of dimethylsiloxy units, methylphenylsiloxy units and methylvinylsiloxy units. Preferably, at least 50% of the $R^{10}$ and $R^{11}$ groups of the silanol chainstopped polydiorganosiloxanes are alkyl groups of 1 to 8 carbon atoms and most preferably are methyl groups. The rest of the groups are phenyl. Most preferably all of the $R^{10}$ and $R^{11}$ groups are methyl groups since this polymer is the cheapest to produce. However, other substituent groups may be introduced into the polymer of Formula (7) as disclosed previously so as to give the final cured composition the desired physical properties.

The high temperature stability of the composition and also its oil resistance preferably one enhanced by incorporating into the composition from 2 to 20 parts per 100 parts by weight of the base polymer of a fluid polysiloxane containing a high degree of trifunctionality, tetrafunctionality or a mixture of tri and tetrafunctionality and comprising (i) from 5 to 60 mole percent of monoalkylsiloxy units, siloxy units or a mixture of such units; (ii) from 1 to 6 mole percent of trialkylsiloxy units and (iii) from 34 to 94 mole percent of dialkylsiloxy units, said polysiloxane containing from about 0.1 to about 2% by weight of silicon-bonded hydroxyl groups.

The highly trifunctional polysiloxane component of fluid polysiloxane can be made by means known to those skilled in the Art. For example, a mixture of (i) monoalkyltrichlorosilane; (ii) dialkyldichlorosilane; (iii) alkyltrichlorosilane; and silicon tetrachloride, or a mixture thereof at the appropriate mole ratio can be run into toluene and water to cohydrolyze them. Then the mixture can be heated, e.g., at about 60° for time, e.g., 3 hours sufficient to insure completion of the reaction. The oil phase is separated and neutralized by washing with an aqueous solution of sodium carbonate or bicarbonate. After filtration to remove insolubles and devolatilization, e.g., by heating at about 140° C. under vacuum, at about 2 millimeters of mercury the above fluid polysiloxane with high trifunctionality remains as a residue. It is preferred to keep the silicon bonded hydroxyl content to less than 0.6% by weight to minimize the viscosity of the sealant composition and to keep the crosslinking level to a minimum. This is done by heating the product at 110° C. in the presence of approximately 1% of sodium carbonate. The water from the silanol condensation can be conveniently removed by azeotropic distillation, e.g., with toluene. After removal of the toluene by distillation, the product is filtered before use.

The foregoing procedure for making the highly trifunctional polysiloxane fluid is set forth in more detail in Beers, U.S. Pat. No. 3,382,205, which is incorporated into the present case by reference. Accordingly, generally, this fluid polysiloxane will comprise from 2 to 20 parts by weight of the base silanol polymer and preferably from 5 to 15 parts per 100 parts by weight of the total composition. Preferably, the highly trifunctional polysiloxane will have a viscosity in the range of 50 to 300 centipoise at 25° C. and preferably at least 50% of its alkyl substituents are methyl and the fluid comprises from 0.2 to 6% by weight of silanol. Especially, preferably, the monoalkylsiloxy units or mixtures of such units comprise about 35 to 45 mole percent, the trialkylsiloxy units comprise from 3 to 5 mole percent and the dialkylsiloxy units comprise from 50 to 62 mole percent and the silanol content is from about 0.2 to 0.5 percent by weight.

It should be noted that this trifunctional fluid polysiloxane component is a necessary ingredient in the most preferred composition of the instant case and specifically one in which the carboxyl crosslinking agent is a silane in which the carboxyl group has from 6 to 30 carbon atoms. This composition will not have sufficient oil resistance and high temperature stability without the combination of carboxyl functional silane described above and the highly trifunctional fluid polysiloxane that was discussed.

In addition to the above, there may optionally be included an iron oxide thermal stabilizer in the preferred composition of the instant case. Such an iron oxide is an item of commerce and is readily available in finely divided form for use as a filler in plastic compositions. Accordingly, there may be utilized anywhere from 1 to 10 parts by weight of the iron oxide stabilizer per 100 parts of the base silanol polymer, stabilizer being a finely divided iron oxide stabilizer that makes the composition heat stable at operating at temperatures of 140° C. and above. Preferably, the iron oxide is of the type that has a pH in the range of 6.0 to 7.5 to achieve maximum thermal shelf age and stability. Again, as stated previously, the amount that can be utilized will be 1 to 10 parts by weight based on 100 parts of a silanol base polymer or from 3 to 6 parts by weight based on 100 parts of a total composition.

Accordingly, in the preferred composition, there may be utilized anywhere from 2 to 20 parts by weight based on 100 parts of the silanol terminated base polymer.

Further, per 100 parts of the base polymer there may be used a linear diorganopolysiloxane polymer having a viscosity varying from 10 to 20,000 centipoise at 25° C. and more preferably having a viscosity varying from 50 to 10,000 centipoise at 25° C., where the organo groups are selected from monovalent hydrocarbon radicals such as alkyl radicals of 1 to 8 carbon atoms, such as methyl radicals; cycloalkyl radicals such as cycloheptyl, and etc; mononuclear aryl radicals such as phenyl, methylphenyl and etc., and haloalkyl radicals such as 3,3,3-trifluoropropyl. The polymer is triorganosiloxy terminated and preferably has less than 500 parts per million of silanol groups. The silanol groups are not put consciously into the polymer but result in the polymer as the result of the process by which it is made. It can be appreciated that the silanol group content of the polymer can vary within wide limitations depending on the manner in which it is made. Production of such polymers is well-known and generally comprises the hydrolysis of diorganodichlorosilanes with triorganochlorosilanes to produce low viscosity polymers. The high viscosity polymers are produced by the equilibration of diorganocyclotetrasiloxanes with mild acid catalysts in the presence of chainstoppers such as, hexamethyldisiloxane to produce an equilibration reaction desired polymers in yields as high as 85% or more. Such equilibration technique is only utilized for high viscosity polymers and the lower viscosity polymers with which the present invention is concerned are produced by hydrolysis reactions which introduce some water or silanol groups into the polymer as stated previously. Such linear diorganosiloxane polymers which are triorganosiloxy end-stopped are utilized as plasticizers in the instant composition to increase the elongation of the composition.

The composition with the iron oxide and minus the plasticizer, that is, minus the linear diorganopolysiloxane polymer, which is triorgano end-stopped is suitable as a high temperature gasketing material which has oil resistance such that it can be utilized as gasketing material in automobile engines and various portions of automobile engines in which the gasketing material comes in contact with oil and the various other agents. Desired properties of the composition are that it does have a mild odor and is low-corrosive as distinguished from the former compositions that liberate acetic acid upon curing. However, the compositions of the instant case, minus the iron oxide for thermal stability and with the diorganopolysiloxane plasticizer, that is, the linear diorganopolysiloxane polymer, which is triorganosiloxy end-stopped, which is present at a concentration of 2 to 40 parts per 100 parts of the base silanol polymer along with the methyl tris(2-ethylhexanoxy) silane as a crosslinking agent, a curing catalyst, fumed silica and the highly trifunctional fluid polysiloxane results in one-part RTV composition that can be formulated to have a low modulus, that is, a high elongation suitable as a general purpose construction sealant.

The silyl maleates and fumarates and succinates of the instant case can be utilized in such a composition to result in a one-part RTV composition with good adhesion to various substrates. Such compositions with the foregoing maleates, fumarates and succinates have been found to be good sealants with good adhesion to wood with good self-bonding adhesion in the absence of a primer, to latex and water based paints, to concrete, acrylic plastics, ABS plastics, polycarbonate plastics among others and adhere to various metals such as stainless steel, Alcad aluminum, etc.

It should be noted that in such RTV systems, that is, ones having a carboxyl functional silane in which the carboxyl group contained from 6 to 30 carbon atoms, no other self-bonding additives have been found to be quite as effective as the self-bonding additives of the compositions of the instant case.

It should be further noted that the compositions of the instant case are formulated to one-component or one-part RTV compositions, that is, all the ingredients are mixed under anhydrous conditions or substantially in an anhydrous state and packaged in a waterproof container as a one-component system or a one-part RTV system. When it is desired to apply and cure the composition to form a silicone elastomer, the composition is applied from the waterproof package to whatever form it is desired and thus exposed to atmospheric moisture. Upon being exposed to atmospheric moisture, the system crosslinks such that it forms a skin in about ten minutes or so and cures to a silicone elastomer in a total curing time varying from 12 to 72 hours.

In the preferred one-part RTV systems of the instant case, the preferred embodiment is a preferred low odor, low-corrosive one-part RTV silicone construction sealant. However, the composition may be utilized for other purposes. It should be also noted that the invention of the instant case is broader than the above preferred embodiment in that invention of this case applies to the use of the foregoing fumarates, maleates and succinates as self-bonding additives for any one-part RTV system in which there is a hydrocarbonoxy functional crosslinking agent or carboxyl functional crosslinking agent such as, methyltrimethoxysilane or methyltriacetoxysilane, irrespective of the carbon atoms in the hydrocarbonoxy functional crosslinking agent or of the carbon atoms in the carboxyl groups in the carboxyl functional crosslinking agent.

The examples below are given for the purpose of illustrating the present invention. They are not given for any purpose of setting any limitations or limiting the definition of the instant invention as set forth in the specification. All parts in the examples are by weight.

EXAMPLE 1

There was prepared a base composition comprising 1000 parts of a silanol terminated dimethylpolysiloxane polymer of 5000 centipoise viscosity at 25° C., to which was added 200 parts of fumed silica which was treated with octamethylcyclotetrasiloxane to which was added 100 parts of highly trifunctionality fluid polysiloxane having a viscosity of 45 centipoise at 25° C. having 40 mole percent of monomethyl siloxy units, 56 mole percent of dimethylsiloxy units and 4 mole percent of trimethylsiloxy units to which was added 2.0 grams of a polyether containing ethylene oxide groups and propylene oxide groups as a flow control agent. The filler was mixed in at room temperature for one hour and then the mixture dried for one hour at 110° C. with 6 millimeter vacuum. There was taken 100 parts of the foregoing mixed ingredients referred to as Base Polymer A which was then catalyzed on a Semco-Semkit catalyzer for 20 minutes as follows.

Accordingly, to 100 parts of the foregoing Base Polymer A disclosed above there was added 6 parts of methyl-tris (2-ethylhexanoyloxy)silane, 1.0 parts of bis-(trimethoxysilylpropyl) maleate, 0.05 parts of dibutyl tin dilaurate to form Composition A. There was prepared, a Composition B, with the same type and same amount of ingredients which were mixed into Composition A except there was not utilized any maleate. The catalyzed compositions were applied to one inch by six inch Alclad aluminum panels with 20 mesh stainless steel screens. There was applied one-eighth of an inch sealant over the panel and one-sixteenth of an inch over the screen. The specimen was allowed to cure for ten days at 50% R. H. and 22° F. The resulting peel adhesion value was 35 lbs/in. accompanied by 100% cohesive failure.

EXAMPLE 2

There was prepared another base composition exactly the same as Base Composition A in Example 1 and catalyzed using the same catalyst and crosslinker system except 1.0 parts of bis-trimethoxysilylpropyl fumarate was used in place of the bis-(trimethoxysilylpropyl)-maleate. Peels were prepared as described in Example 1. The composition which contained the silyl fumarate had a peel strength of 31 lbs per inch with 100% cohesive failure.

EXAMPLE 3

There was prepared another base composition exactly the same as Base Composition A as described in Example 1. One hundred parts of this Base Composition A was catalyzed on a Sem-kit catalyzer with 6.0 parts of methyl tris(2-ethylhexanoyloxy) silane, 1.0 parts of bis-trimethoxysilylpropyl succinate and 0.05 parts of dibutyl tin dilaurate. The average peel on alclad aluminum was 38 lbs. per inch with 85 percent cohesive failure.

EXAMPLE 4

There was prepared another base composition exactly the same as described Base Composition A in Example 1, except a hexamethyl disilazane treated fumed silica was used as the same parts as the octamethyl cyclotetrasiloxane treated fumed silica. One hundred parts of this base composition was catalyzed on a Semco-Sem-Kit mixer with 6 parts of methyl tris(2-ethylhexanoyloxy) silane, 1.0 parts of bis-trimethoxy silyl propyl maleate and 0.05 parts of dibutyl tin dilaurate. The average peel on alclad aluminum was 55 lbs per inch with 100% cohesive failure.

EXAMPLE 5

There was prepared a base composition comprising 1000 parts of a silanol terminated dimethyl siloxane polymer of 30,000 centipoise viscosity at 25° C., to which was added 200 parts of a fumed silica which was treated with octomethylcyclotetrasiloxane, to which was added 120 parts of the highly trifunctional fluid polysiloxane and 2 parts of the flow control agent mentioned in Base Composition A, Example 1, and 400 parts of trimethyl siloxy terminated polydimethylsiloxane fluid of 100 centipoise. The batch was cooked and catalyzed as described in Example 1.

Accordingly, 100 parts of the base mixture was catalyzed with 6 parts of methyl-tris(2-ethylhexanoyloxy)silane and 1.0 parts of bis-(trimethoxy silyl propyl)maleate and 0.05 parts of dibutyl tin dilaurate peel samples were prepared on plexiglass (methyl methacrylate) and alclad aluminum as described in EXAMPLE 1. The peel strength on methyl methacrylate was 35 lbs per inch with 100% cohesive failure.

EXAMPLE 6

There was prepared another base composition exactly the same as described in Example 5. 100 parts of this base composition was catalyzed on the Sem-Kit mixer with 6 parts of methyl-tris(2-ethylhexanoyloxy) silane and 1.0 parts of bis-(trimethoxy silyl propyl)succinate and 0.05 parts of dibutyl tin dilaurate. Peel samples were prepared on alclad aluminum as described in Example 1. The peel strength on the aluminum was 36 lbs per inch with 100% cohesive failure.

We claim:

1. A self-bonding room temperature vulcanizable silicone rubber composition comprising (a) 100 parts by weight of a silanol-terminated diorganopolysiloxane having a viscosity varying from 300 to 10,000,000 centipoise at 25° C. where the organo is a monovalent hydrocarbon radical; (b) from 5 to 200 parts by weight of a filler; (c) from 2 to 10 parts by weight of a crosslinking agent selected from the class consisting of carboxylic functional silanes and hydrocarbonoxy functional silanes; (d) from 0.01 to 5 parts by weight of a curing catalyst selected from the class consisting of carboxylic acid salts and titanates; and (e) from 0.1 to 3 parts by weight of a self-bonding additive selected from the groups consisting of

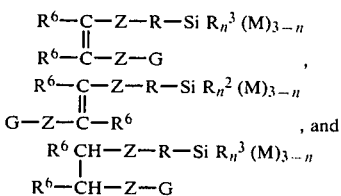

where Z is selected from

phenylene,

CONH and CONR$_2^2$ G is selected from the class consisting of hydrogen, R', R$^4$ Si R$_n^2$ (M)$_{3-n}$ where R' is selected from monovalent hydrocarbon radicals and halogenated monovalent hydrocarbon radicals, R and R$^4$ is a divalent hydrocarbon radical, R$^2$ is selected from monovalent hydrocarbon radicals and halogenated monovalent hydrocarbon radicals, M is selected from R$^3$O and R$^3$

radicals R$^3$ is selected from monovalent hydrocarbon radicals and halogenated monovalent hydrocarbon radicals, R$^6$ is selected from hydrogen, and alkyl radicals of up to 10 carbon atoms, and n is a whole number that varies from 1 to 3, and self-bonding polysiloxane additives selected from the group consisting of the formulas,

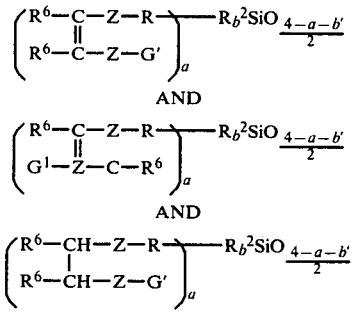

where G' is selected from the class consisting of hydrogen, R' and

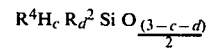

and where Z, R', R$^4$, R$^2$, R$^6$ and R are as previously defined, a varies from 0.005 to 2.0, b' varies from 1.0 to 2.5 the sum of a+b varies from 1.005 to 3.0, c varies from 0 to 1.0, d varies from 1.0 to 2.5 and the sum of c+d varies from 1.0 to 2.0.

2. The composition of claim 1 wherein R is propylene, M is R$^3$ O and R$^2$ and R$^3$ are methyl.

3. The composition of claim 1 wherein the crosslinking agent has the formula,

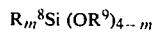

wherein R$^8$ is a monovalent hydrocarbon radical, R$^9$ is an organic radical of 6 to 30 carbon atoms selected from hydrocarboyl and halohydrocarboyl and m is 0 or 1.

4. The composition of claim 3 wherein there is further present from 2 to 20 parts by weight of a fluid polysiloxane containing a high degree of trifunctionality, tetrafunctionality or a mixture of tri- and tetrafunctionality and comprising;
 (i) from 5 to 60 mole percent of monoalkylsiloxy units, siloxy units or a mixture of such units;

(ii) from 1 to 6 mole percent of trialkylsiloxy units; and (iii) from 34 to 94 mole percent of dialkylsiloxy units, said polysiloxane containing from about 0.1 to about 2% by weight of silicone bonded hydroxyl groups.

5. The composition of claim 4 wherein the curing catalyst comprises an organic tin salt of an organic acid or a tin salt of an organic acid, said organic acid containing from 2 to 6 carbon atoms.

6. The composition of claim 5 further including from 1 to 10 parts by weight of a finely divided iron oxide thermal stabilizer.

7. The composition of claim 5 wherein the silanol terminated diorganopolysiloxane has the formula,

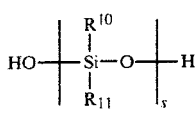

wherein $R^{10}$ and $R^{11}$ are used independently, organic radicals of up to 8 carbon atoms selected from hydrocarbyl, halohydrocarbyl and s is an average number of from about 10 to 15,000.

8. The composition of claim 5 wherein there is present from 10 to 100 parts by weight of a finely divided silica filler.

9. The composition of claim 7 wherein in component (a) at least 50% of the total number of $R^{10}$ and $R^{11}$ radicals are alkyl radicals and any remaining groups are aryl radicals.

10. The composition of claim 7 wherein in the fluid polysiloxane containing a high degree of trifunctionality, the monoalkylsiloxy units, siloxy units or mixed such units comprise about 35 to 45 mole percent, the trialkylsiloxy units comprise from 3 to 5 mole percent, the dialkylsiloxy units comprise from 50 to 62 mole percent, and the silicon bonded hydroxyl content is about 0.2 to 0.5% by weight.

11. The composition of claim 7 wherein the $R^9$ groups are 2-ethylhexanoxy radicals.

12. The composition of claim 7 wherein the $R^9$ groups are benzoxy radicals.

13. The composition of claim 7 wherein the curing catalyst is dibutyl tin diacetate.

14. The composition of claim 7 wherein the iron oxide has a pH range of 6.0 to 7.5 and comprises 3 to 6 parts by weight per 100 parts of the total composition.

15. A process for forming a self-bonding room temperature vulcanizable silicone rubber composition comprising (1) mixing (a) 100 parts by weight of a silanol terminated diorganopolysiloxane polymer having a viscosity varying from 1,000 to 10,000,000 centipoise at 25° C. where the organo groups is a monovalent hydrocarbon radical; (b) from 10 to 200 parts by weight of a filler; (c) 2 to 10 parts by weight of a crosslinking agent selected from the class consisting of carboxyl functional silanes and hydrocarbonoxy functional silines; (d) from 0.01 to 5 parts by weight of a curing catalyst selected from the class consisting of carboxylic acid salts and titanates; and (e) from 0.1 to 3 parts by weight of a self-bonding additive selected from the group consisting of:

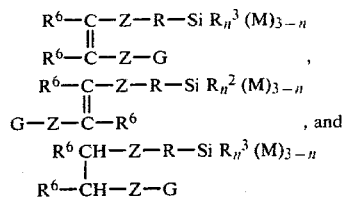

where Z is selected from

phenylene,

CONH and $CONR_2^2$ G is selected from the class consisting of hydrogen, R′, $R^4SiR^2_n (M)_{3-n}$ where R′ is selected from monovalent hydrocarbon radicals and halogenated monovalent hydrocarbon radicals, R and $R^4$ is a divalent hydrocarbon radical, $R^2$ is selected from monovalent hydrocarbon radicals and halogenated monovalent hydrocarbon radicals, M is selected from $R^3O$ and $R^3$

radicals $R^3$ is selected from monovalent hydrocarbon radicals and halogenated monovalent hydrocarbon radicals, $R^6$ is selected from hydrogen, and alkyl radicals of up to 10 carbon atoms, and n is a whole number that varies from 1 to 3, and self-bonding polysiloxane additives selected from the group consisting of the formulas,

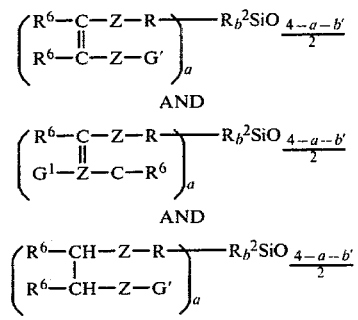

where G′ is selected from the class consisting of hydrogen, R′ and

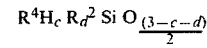

and where Z, R′, $R^4$, $R^2$, $R^6$ and R are as previously defined, a varies from 0.005 to 2.0, b′ varies from 1.0 to 2.5 the sum of a+b varies from 1.005 to 3.0, c varies from 0 to 1.0, d varies from 1.0 to 2.5 and the sum of c+d varies from 1.0 to 2.0.

16. A laminate formed from a substrate and a self-bonding room temperature vulcanizable silicone rubber compositions comprising (1) a substrate selected from the class consisting of plastic substrates, metal substrates, masonry substrates and wood substrates; and (2) directly bonded to the substrate in the absence of a primer a self-bonding room temperature vulcanizable silicone rubber composition (a) 100 parts by weight of a silanol terminated diorganopolysiloxane having a viscosity varying from 300 to 10,000 centipoise at 25° C. where the organo is a monovalent hydrocarbon radical; (b) from 5 to 200 parts by weight of a filler; (c) from 2 to 10 parts by weight of a crosslinking agent selected from the class consisting of carboxylic functional silanes and hydrocarbonoxy functional silanes; (d) from 0.01 to 5 parts by weight of a curing catalyst selected from the class consisting of carboxylic acid salts and titanates; and (e) from 0.1 to 3 parts by weight of a self-bonding additive selected from the groups consisting of:

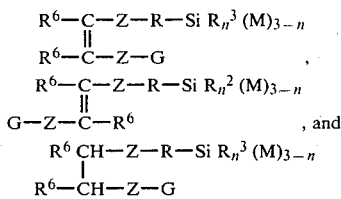

where Z is selected from

phenylene,

CONH and CONR$_2{}^2$ G is selected from the class consisting of hydrogen, R', R$^4$SiR$_n{}^2$(M)$_{3-n}$ where R' is selected from monovalent hydrocarbon radicals and halogenated monovalent hydrocarbon radicals, R and R$^4$ is a divalent hydrocarbon radical, R$^2$ is selected from monovalent hydrocarbon radicals and halogenated monovalent hydrocarbon radicals, M is selected from R$^3$O and R$^3$

radicals R$^3$ is selected from monovalent hydrocarbon radicals and halogenated monovalent of hydrocarbon radicals, R$^6$ is selected from hydrogen, and alkyl radicals of up to 10 carbon atoms and n is a whole number that varies from 1 to 3, and self-bonding polysiloxane additives selected from the group consisting of the formulas,

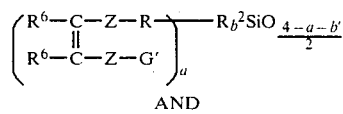

AND

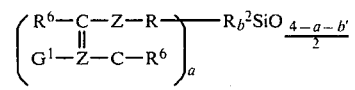

AND

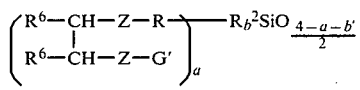

where G' is selected from the class consisting of hydrogen, R' and

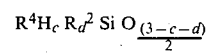

and where Z, R', R$^4$, R$^2$, R$^6$ and R are as previously defined, a varies from 0.005 to 2.0, b' varies from 1.0 to 2.5 the sum of a+b varies from 1.005 to 3.0, c varies from 0 to 1.0, d varies from 1.0 to 2.5 and the sum of c+d varies from 1.0 to 2.0, and (2) allowing the composition to cure at room temperature.

17. The laminate of claim 16 wherein R is propylene, M is R$^3$O and R$^2$ and R$^3$ are methyl.

18. The laminate of claim 16 wherein the crosslinking agent has the formula, $$R^8{}_m Si(OR^9)_{4-m}$$

where R$^8$ is a monovalent hydrocarbon radical, R$^9$ is an organic radical of 6 to 30 carbon atoms selected from hydrocarboyl and halohydrocarboyl and m is 0 or 1.

19. The laminate of claim 18 wherein there is further present from 2–20 parts by weight of a fluid polysiloxane containing a high degree of trifunctionality, tetrafunctionality or a mixture of tri- and tetrafunctionality and comprising,
(i) from 5 to 60 mole percent of monoalkylsiloxy units, siloxy units or a mixture of such units;
(ii) from 1 to 6 mole percent of trialkylsiloxy units; and
(iii) from 34 to 94 mole percent of dialkylsiloxy units, said polysiloxane containing from about 0.1 to about 20% by weight of silicone bonded hydroxyl groups.

20. A laminate of claim 19 wherein the curing catalyst comprises an organic tin salt of an organic acid or a tin salt of an organic acid, said organic acid containing from 2 to 6 carbon atoms.

21. The laminate of claim 20 further including from 1 to 10 parts by weight of a finely divided iron oxide thermal stabilizer.

22. The laminate of claim 20 wherein the silanol terminated diorganopolysiloxane has the formula,

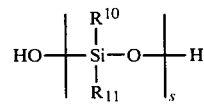

wherein R$^{10}$ and R$^{11}$ are used independently, organic radicals of up to 8 carbon atoms selected from hydrocarbyl, halohydrocarbyl and s is an average number of from about 10 to 15,000.

23. The laminate of claim 20 wherein there is present from 5 to 100 parts by weight of a finely divided silica filler.

24. The laminate of claim 22 wherein in component (a) at least 50% of the total number of $R^{10}$ and $R^{11}$ radicals are alkyl radicals and any remaining groups are aryl radicals.

25. The laminate of claim 22 wherein in the fluid polysiloxane containing a high degree of trifunctionality, the monoalkylsiloxy units, siloxy units or mixed such units comprises about 35 to 45 mole percent, the trialkylsiloxy units comprise from 3 to 5 mole percent, the dialkylsiloxy units comprise from 50 to 62 mole percent, and the silicon bonded hydroxyl content is about 0.2 to 0.5% by weight.

26. The laminate of claim 22 wherein the $OR^9$ groups are 2-ethylhexanoxy radicals.

27. The laminate of claim 22 wherein the $OR^9$ groups are benzoxy radicals.

28. The laminate of claim 22 wherein the curing catalyst is dibutyltin diacetate.

29. The laminate of claim 22 wherein the iron oxide has a pH range of 6.0 to 7.5 and comprises 3 to 6 parts by weight per 100 parts of the total composition.

30. A process for forming a laminate without the use of a primer comprising, (1) applying to a substrate selected from the group consisting of plastic substrates, metal substrates, masonry substrates, and cellulosic substrates a self-bonding room temperature vulcanizable silicone rubber composition having (a) 100 parts by weight of a silanol-terminated diorganopolysiloxane having a viscosity varying from 300 to 10,000,000 centipoise at 25° C. where the organo is a monovalent hydrocarbon radical (b) from 10 to 200 parts by weight of a filler; (c) from 2 to 10 parts by weight of a crosslinking agent selected from the class consisting of carboxylic functional silanes and hydrocarbonoxy functional silanes; (d) from 0.01 to 5 parts by weight of a curing catalyst selelcted from the class consisting of carboxylic acid salts and titanates; and (e) from 0.1 to 3 parts by weight of a self-bonding additive selected from the groups consisting of,

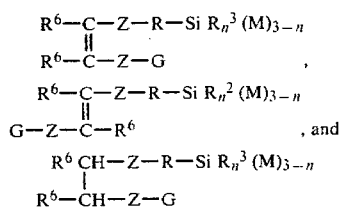

where Z is selected from

phenylene,

CONH and $CONR_2{}^2$ G is selected from the class consisting of hydrogen, R', $R^4SiR_n{}^2(M)_{3-n}$ where R' is selected from monovalent hydrocarbon radicals and halogenated monovalent hydrocarbon radicals, R and $R^4$ are divalent hydrocarbon radical, $R^2$ is selected from monovalent hydrocarbon radicals and halogenated monovalent hydrocarbon radicals, M is selected from $R^3O$ and $R^3$

radicals $R^3$ is selected from monovalent hydrocarbon radicals and halogenated monovalent hydrocarbon radicals, $R^6$ is selected from hydrogen, and alkyl radicals of up to 10 carbon atoms, and n is a whole number that varies from 1 to 3, and self-bonding polysiloxane additives selected from the group consisting of the formulas,

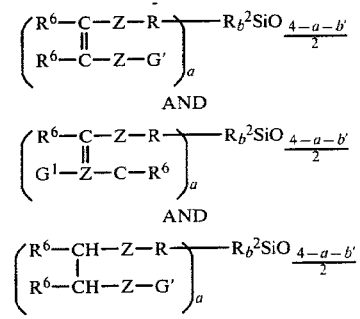

where G' is selected from the class consisting of hydrogen, R' and

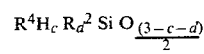

and where Z, R', $R^4$, $R^2$, $R^6$ and R are as previously defined, a varies from 0.005 to 2.0, b' varies from 1.0 to 2.5 the sum of a+b varies from 1.005 to 3.0, c varies from 0 to 1.0, d varies from 1.0 to 2.5 and the sum of c+d varies from 1.0 to 2.0, (2) allowing the self-bonding room temperature vulcanizable composition to cure at room temperature in the absence of a primer.

* * * * *